United States Patent
Brown et al.

(10) Patent No.: US 6,959,081 B2
(45) Date of Patent: Oct. 25, 2005

(54) EXPERT HOLD QUEUE MANAGEMENT

(75) Inventors: Michael Wayne Brown, Georgetown, TX (US); David R. Cheng, Wilmington, DE (US); Wing-Ying Stephanie Leung, Ann Arbor, MI (US); Folu Okunseinde, Oakhurst, NJ (US); Michael A. Paolini, Austin, TX (US); Seema Sheth-Voss, Cambridge, MA (US); Scott Lee Winters, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 466 days.

(21) Appl. No.: 10/005,828

(22) Filed: Dec. 3, 2001

(65) Prior Publication Data
US 2003/0103621 A1 Jun. 5, 2003

(51) Int. Cl.[7] .................................. H04M 3/00
(52) U.S. Cl. ..................... 379/265.11; 379/266.01; 379/309
(58) Field of Search ............... 379/202.01, 265.01, 379/265.02, 265.11, 266.01, 309

(56) References Cited

U.S. PATENT DOCUMENTS

| 4,266,098 A | 5/1981 | Novak ..................... 379/77 |
| 4,953,204 A | 8/1990 | Cuschleg, Jr. et al. .. 379/266.05 |
| 5,311,574 A | 5/1994 | Livanos ................... 379/209.01 |
| 5,444,774 A | 8/1995 | Friedes .................... 379/266.01 |
| 5,572,587 A | 11/1996 | Gaglani ................... 379/393 |

(Continued)

FOREIGN PATENT DOCUMENTS

| JP | 3140089 A | 4/1991 | ............ H04M/3/50 |
| JP | 2000278413 A | 10/2000 | ............ H04M/3/48 |

OTHER PUBLICATIONS

YOR920010179
4/13 Inspec—(C) Inspec AN: 5375878.
6/13 Inspec—(C) Inspec AN: 5048708.
U.S. Appl. No. 10/005,733.
U.S. Appl. No. 10/005,680.
U.S. Appl. No. 10/006,004.
U.S. Appl. No. 10/004,664.

Primary Examiner—Ahmad F. Matar
Assistant Examiner—Quynh H. Nguyen
(74) Attorney, Agent, or Firm—Mark S. Walker; Amy J. Pattillo (57) ABSTRACT

A method, system, and program for expert hold queue management are provided. A call is received at a call center. The call is placed on hold in a hold queue until a representative of the call center is available to answer the call. While on hold in the hold queue, the call is transferred to an expert. In particular, the call may be transferred to a second hold queue within the first hold queue if the expert is not immediately available. Experts may include freelance experts, query based experts, and emergency response experts. Then, responsive to detecting the call at the top of the call queue, the caller is notified of an availability of a representative. The caller may select to remain with the expert or transfer to the representative.

5 Claims, 6 Drawing Sheets

U.S. PATENT DOCUMENTS

| | | | |
|---|---|---|---|
| 5,724,408 A | 3/1998 | Morganstein | 379/88.2 |
| 5,806,045 A | 9/1998 | Biorge et al. | 705/14 |
| 5,864,617 A | 1/1999 | Donnelly | 379/266.07 |
| 5,867,572 A | 2/1999 | MacDonald et al. | 379/266.06 |
| 5,872,841 A | 2/1999 | King et al. | 379/210.01 |
| 5,875,231 A | 2/1999 | Farfan et al. | 379/67.1 |
| 5,889,845 A | 3/1999 | Staples et al. | 379/211.02 |
| 5,903,642 A | 5/1999 | Schwartz et al. | 379/309 |
| 5,905,793 A | 5/1999 | Flockhart et al. | 379/266.06 |
| 5,933,828 A | 8/1999 | Eitel et al. | 707/10 |
| 5,946,378 A | 8/1999 | Farfan | 379/88.23 |
| 5,956,024 A | 9/1999 | Strickland et al. | 715/717 |
| 5,978,467 A | 11/1999 | Walker et al. | 379/266.01 |
| 6,014,439 A * | 1/2000 | Walker et al. | 379/266.01 |
| 6,028,917 A | 2/2000 | Creamer et al. | 379/100.01 |
| 6,046,762 A | 4/2000 | Sonesh et al. | 348/14.11 |
| 6,049,603 A | 4/2000 | Schwartz et al. | 379/309 |
| 6,064,730 A | 5/2000 | Ginsberg | 379/265.09 |
| 6,125,178 A * | 9/2000 | Walker et al. | 379/211.01 |
| 6,236,722 B1 | 5/2001 | Gilbert et al. | 379/230 |
| 6,263,066 B1 | 7/2001 | Shtivelman et al. | 379/266.06 |
| 6,327,346 B1 | 12/2001 | Infosino | 379/88.02 |
| 6,349,132 B1 | 2/2002 | Wesemann et al. | 379/88.17 |
| 6,381,316 B2 | 4/2002 | Joyce et al. | 379/114.2 |
| 6,404,873 B1 * | 6/2002 | Beyda et al. | 379/202.01 |
| 6,522,743 B1 | 2/2003 | Hurd | 379/266.04 |
| 6,535,492 B2 | 3/2003 | Shtivelman | 370/270 |
| 6,606,596 B1 | 6/2003 | Zirngibl et al. | 704/270 |
| 6,639,982 B1 | 10/2003 | Stuart et al. | 379/266.03 |
| 6,658,093 B1 | 12/2003 | Langseth et al. | 379/88.17 |
| 6,711,249 B2 | 3/2004 | Weissman et al. | 379/221.06 |
| 6,724,866 B2 | 4/2004 | Kuhn et al. | 379/88.21 |
| 6,738,473 B1 | 5/2004 | Burg et al. | 379/266.01 |
| 2002/0046030 A1 | 4/2002 | Haritsa et al. | 704/256 |
| 2002/0055967 A1 | 5/2002 | Coussement | 709/202 |
| 2002/0055975 A1 | 5/2002 | Petrovykh | 709/205 |
| 2002/0164000 A1 | 11/2002 | Cohen et al. | 379/88.17 |
| 2003/0031309 A1 * | 2/2003 | Rube et al. | |
| 2003/0053615 A1 | 3/2003 | Anderson et al. | 379/265.09 |
| 2003/0103617 A1 | 6/2003 | Brown et al. | 379/265.02 |
| 2003/0103618 A1 | 6/2003 | Brown et al. | 379/265.09 |
| 2003/0103620 A1 | 6/2003 | Brown et al. | 379/266.01 |
| 2003/0103621 A1 | 6/2003 | Brown et al. | 704/9 |
| 2003/0108186 A1 | 6/2003 | Brown et al. | 379/266.01 |
| 2004/0057569 A1 | 3/2004 | Busey et al. | 379/265.09 |

* cited by examiner

REPRESENTATIVE CALL HOLD QUEUE — 60

| POSITION | CALLER ID | OPTION |
|---|---|---|
| 1 | 5120001111 | MUSIC |
| 2 | 5120002222 | FREELANCE #4 |
| 3 | 5120003333 | EMERGENCY |
| 4 | 5120004444 | EMERGENCY |
| 5 | 5120005555 | EMERGENCY |
| 6 | 5120006666 | PRINTER GROUP |
| 7 | 5120007777 | MODEM GROUP |
| 8 | 5120008888 | FREELANCE #4 |
| 9 | 5120009999 | PRINTER GROUP |

FIG. 3

FREELANCE EXPERT CALL HOLD QUEUE — 70

| POSITION | CALLER ID | OPTION |
|---|---|---|
| 1 | 5120002222 | HARDWARE A |
| 2 | 5120008888 | HARDWARE A |

FIG. 4

QUERY RELATED CALL GROUP DATABASE — 80

| PARTICIPANT ID | CALLER ID | BROADCAST QUEUE |
|---|---|---|
| 006 | 5120006666 | 5 |
| 009 | 5120009999 | - |

FIG. 5

EMERGENCY DJ GROUP DATABASE — 90

| PARTICIPANT ID | CALLER ID | QUESTION QUEUE |
|---|---|---|
| 003 | 5120003333 | 2 |
| 004 | 5120004444 | 1 |
| 005 | 5120005555 | 4 |

EXPERT HOLD QUEUE MANAGEMENT (1) U.S. Pat. Ser. No. 6,826,276, titled "Managing Caller Profiles Across Multiple Call Hold Centers", issued Nov. 30, 2004;

CROSS-REFERENCE TO RELATED APPLICATIONS

The present application is related to the following copending applications, incorporated herein by reference:

(1) U.S. patent application Ser. No. 10/005,733;

(2) U.S. patent application Ser. No. 10/005,680;

(3) U.S. patent application Ser. No. 10/006,004 ; and (4) U.S. patent application Ser. No. 10/004,664.

BACKGROUND OF THE INVENTION

1. Technical Field

The present invention relates in general to telecommunications and, in particular, to call hold centers. Still more particularly, the present invention relates to managing experts within a call hold queue.

2. Description of the Related Art

Many companies provide telephone-based access to help staff, sales personnel, representatives, and automated menus via a call center. Where high telephone call traffic is typical in telephone access to a company's representatives, a PBX system receives the call and distributes the call to an automatic call distributor (ACD), thus incorporating a hold function in the call center. ACDs are often employed to provide an even and systematic distribution of incoming calls to multiple representatives. In particular, ACDs typically provide incoming calls with a direct connection to an available representative until all representatives are busy. Then, calling parties are placed in a call queue, and selectively connected to a representative once a representative comes available.

Call queues may cause frustration and ill will of consumers towards a company, particularly where excessively long waits, full queues and accidental disconnects are encountered. In order to alleviate frustrations, before a call is placed in a hold queue, a greeting message identifying the called party is played by the ACD, via an interactive voice response unit (IVRU), to the caller, indicating that the next available agent will service the call. During the holding period, music or advertising messages may be played to the caller to entertain or inform the caller of sales promotions for particular products or services. More enhanced ACD systems may offer additional services to callers, such as news, multiple selections of music, release to make additional phone calls, games while on hold, and other services that make on hold time more pleasant.

In addition, ACD systems may be enhanced by providing multiple queues according to the skills of the agents available to answer calls. Further, each agent may have multiple skills, such that a single agent may answer calls in multiple queues. However, while calls may be divided among multiple queues according to query, callers are still waiting in a queue for the next available representative to answer the call.

In another example, an ACD system may be enhanced by allowing a caller waiting in a call queue to monitor (but not participate in) other caller conversations with similar queries or listed to recorded calls involving similar queries. However, while allowing a caller to listen in to another call may provide help to that caller, the caller is limited to hearing a conversation directed by another caller. Further, the caller listening in to another conversation must still wait until a representative is available to have the caller's questions answered.

Another known method for reducing call holding times is providing the caller with a selection of pre-recorded messages that may address the caller's question, such that the caller need not wait for a representative to have a question answered. However, such a system is limited in that the recorded answer may not precisely match the customer's query, leaving the customer waiting for a representative.

Therefore, in view of the foregoing, it would be advantageous to provide a method, system, and program for placing a call on hold in a first queue in a call center, but allowing a caller to select to speak with an expert while waiting on the call to be answered by a representative of the call center. In particular, it would be advantageous to allow the caller to speak with one of multiple freelance experts, where the freelance experts are rated according to knowledge skills. In addition, in particular, it would be advantageous to provide an expert in an emergency situation to interact concurrently with multiple callers on hold, such that the callers are able to have questions answered by that expert on an emergency subject, rather than listening to a pre-recorded message, and still waiting to talk with a representative.

SUMMARY OF THE INVENTION

In view of the foregoing, it is therefore an object of the present invention to provide an improved telecommunications system.

It is another object of the present invention to provide a method, system and program for improved call hold queues.

It is yet another object of the present invention to provide a method, system and program for managing experts within a call hold queue.

According to one aspect of the present invention, a call is received at a call center. The call is placed on hold in a hold queue until a representative of the call center is available to answer the call. While on hold in the hold queue, the call is transferred to an expert. Experts may include freelance experts, query based experts, and emergency response experts. Then, responsive to detecting the call at the top of the call queue, the caller is notified of an availability of a representative. The caller may select to remain with the expert or transfer to the representative.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

A method, system, and program for managing experts in an on hold queue system are provided. For purposes of the present invention, when a call is received at a call center and all representatives are busy, the call is placed in an on hold system associated with a call center. The on hold system places the call in a hold queue that determines the order in which calls are answered by representatives. Advantageously, while the call is on hold in the on hold system, the call may be passed on to an expert, such that the caller may receive answers to questions with out the need to wait for a representative. However, when the call is next in line to be answered by a representative, the caller may choose whether to remain at the expert or speak to a representative.

For purposes of the present invention, a call center may be accessed via multiple networks including, but not limited to, wireline, wireless, Internet Protocol (IP) and PSTN networks. In addition, a call center may incorporate multiple elements including, but not limited to, a private exchange switching (PBX) systems, automatic call distribution (ACD) systems, on hold systems, voice browsers, interactive voice response units (IVRU), and other systems which typically control a call center.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

The present invention may be executed in a variety of systems, including a variety of computing systems and electronic devices under a number of different operating systems. In one embodiment of the present invention, the on hold call queue system is a computer system that incorporates communication features that provide telephony, messaging, and information services to a plurality of callers. In general, the present invention is preferably executed in a computer system that performs computing tasks such as manipulating data in storage that is accessible to the computer system.

Figure 1:
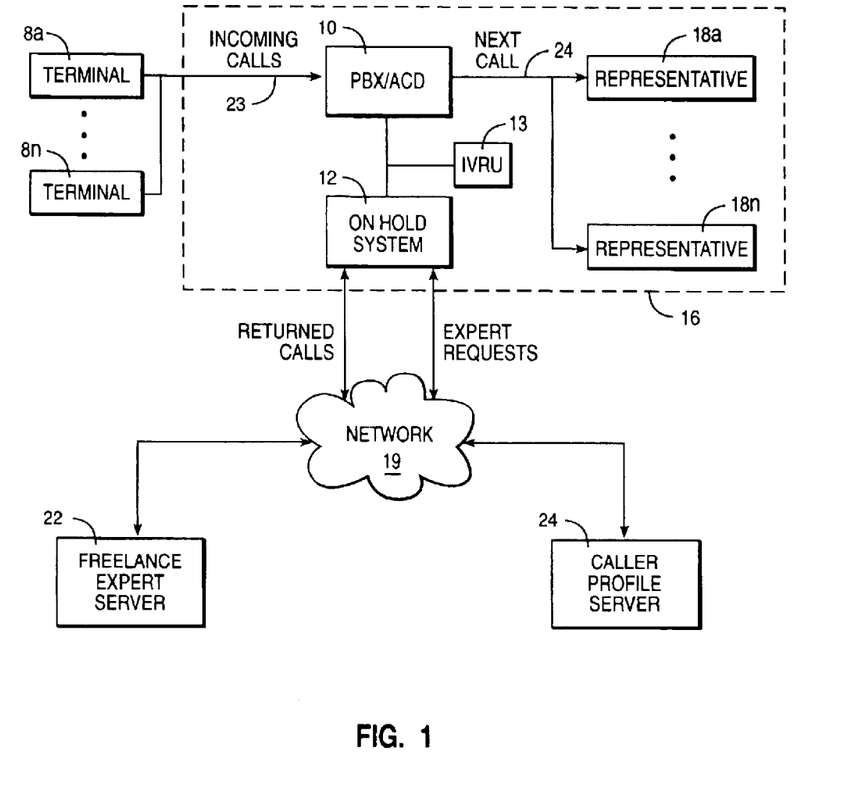
FIG. 1 depicts a block diagram of a network call or contact center system in which the present invention may be implemented.

With reference now to the figures, and, in particular, with reference now to FIG. 1, there is an illustrative network call or contact center environment in which the present invention may be implemented. It will be appreciated by one with skill in the art that although a particular network environment is described below, the invention is not limited to use within the described network environment, rather, the inventive queue position advancement process may be implemented within any on-hold information service regardless of the telephony environment.

As illustrated, multiple incoming calls are received at a call center 16. In particular, a private branch exchange switch PBX 10 with automatic call distribution (ACD) ability receives incoming calls via truck 23, where trunk 23 is connected to a network of wireline, wireless, IP and PSTN connections. In particular, PBX systems are well known in the art as switching systems designed to received telephone calls destined for call center 16 and to queue those call when a call handling agent is not available.

PBX 10 distributes incoming calls to multiple representative terminals 18a–18n via trunk 24. In particular, PBX 10 receives incoming calls via trunk 23 from multiple terminals 8a–8n, wherein terminals 8a–8n may represent, but are not limited to, conventional wireline telephone systems, wireless phones, video phones, personal computers, pervasive computing devices configured with appropriate telephony software and Internet connectivity, telephone stations, other PBXs, or switching systems.

In the description which follows, it will be assumed that all representative terminals 18a–18n are busy and therefore PBX 10 cannot respond to an incoming call by making a direct connection to one of representative terminals 18a-18n. As a result, PBX 10 is forced to place the incoming call on hold. In addition, PBX 10 determines the calling telephone number from caller ID or other methods.

After placing the incoming call on hold, the call and caller ID, time of call, and other information obtained by PBX 10 are forwarded to on hold system 12. On hold system 12 preferably creates a record based on the call and positions the call within a call queue. While in the present embodiment PBX 10 forwards calls to a single on hold system, in alternate embodiments, PBX 10 may forward calls to multiple on hold systems. In addition, on hold system 12 and other on hold systems may be coupled to PBX 10 or may be remotely accessed by PBX 10. Further, while in the present embodiment on hold system 12 is depicted as an independent system, on hold system 12 may also be incorporated within PBX 10.

While the call is on hold, an interactive voice response unit (IVRU) 13, coupled to PBX 10 and on hold system 12, may offer the caller a menu of available options for receiving expert help while waiting in on hold system 12. In general, IVRU 13 is a voice information system which may be arranged to (i) prompt a caller for specific information by asking questions based on a set of modules in a transactions script, (ii) collect that information by detecting and interpreting dual tone multifrequency (DTMF) signals entered by the caller or by recognized speech input by the caller, (iii) organize the collected information in a specific format and (iv) forward the collected information to be utilized within ACD 12. For purposes of the present invention, prompts to the caller may be in voice, text, video, and/or graphical formats depending on the interface receiving the prompt. In addition, for purposes of the present invention, a voice browser may be implemented in lieu of IVRU 13, as described in U.S. patent application Ser. No. 10/006,004.

According to one advantage of the present invention, a caller profile may be accessed by on hold system 12 from a caller profile server 24, via a network 19. On hold system 12 may then use the caller profile to specify the menu of available options and other services provided to the caller while on hold.

Examples of expert help that callers may select from may include, but is not limited to, freelance experts, group experts, and emergency experts. Experts may be accessible directly from on hold system 12. Alternatively, experts, such as freelance experts, may be accessible by transferring a call to a freelance expert server 22 via network 19.

Figure 2:
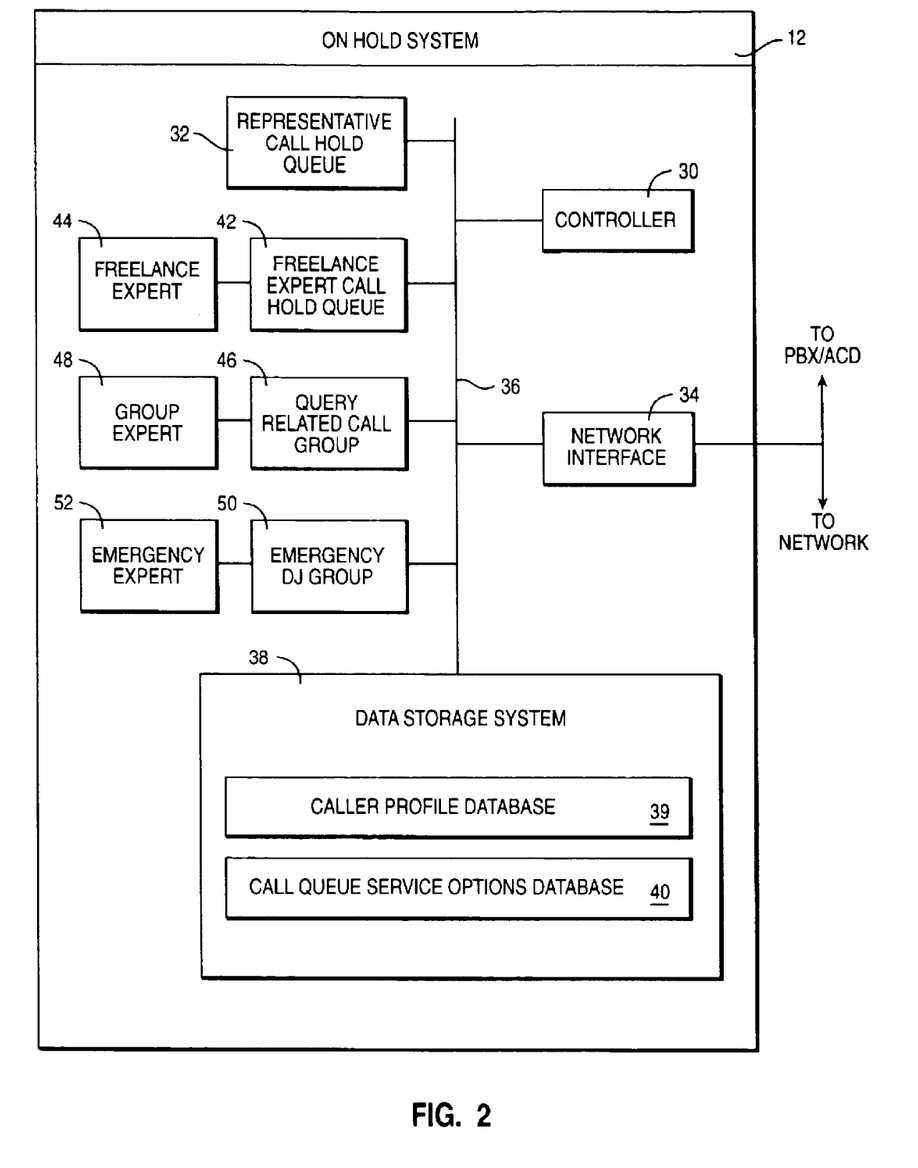
FIG. 2 illustrates a block diagram of an on hold system in accordance with the method, system, and program of the present invention.

With reference now to FIG. 2, there is an illustrative block diagram of an on hold system in accordance with the method, system, and program of the present invention. As illustrated, on hold system 12 includes a controller 30, a representative call hold queue 32, a network interface 34, and a data storage system 38 communicatively connected via a bus 36. In addition, on hold system 12 includes a freelance expert call hold queue 42, a query related call group 46, and an emergency DJ group 50 communicatively connected via bus 36. Additional systems may be connected along bus 36 that are not depicted herein. In particular, controller 30 comprises conventional computer resources including, but are not limited to, at least one processor, memory, a data storage system, system software and application software, that function together to perform the functions described with reference to controller 30.

Network interface 34 preferably communicates with PBX 10 and network 19 via a telephone network or other networking system. In particular, network interface 34 receives transfers of calls from PBX 10 and then returns calls to PBX 10 when a call is the next in line within representative call hold queue 32.

When a call is received at on hold system 12, the call is preferably recorded in representative call hold queue 32 and held in a call holding infrastructure therein. Then, while a call the holding within representative call hold queue 32, the caller is preferably prompted by IVRU 13 to select from the multiple available service options designated in call queue service options database 40. However, according to an advantage of the present invention, the service options are first filtered according to the caller profile associated with the caller ID of the call, such that the caller is only presented with those options that are specifically designated by the caller and those options which are tailored to the caller according to the caller profile. For example, if a caller profile indicates that the caller does not want to be offered freelance expert options, the service options are tailored accordingly.

According to one advantage of the present invention, a caller may select to be connected to one of multiple available freelance experts. Freelance experts may register with call centers to help in designated areas of skill. Callers may select from one of multiple freelance experts in a particular area, depending on a specific skill or ratings of the expert provided by previous callers. Freelance experts may charge a caller for a particular service or may be supplemented by the call center.

For example, for a callers to select from freelance experts, the caller may first enter the topic of the caller query. Then, the caller is prompted to select from among the freelance experts able to handle the query. In particular, a caller may indicate a preference to receive ratings or other information about each expert by a keypad or voice entry.

In the present embodiment, when a caller selects a freelance expert, the call is routed to the freelance expert system. In the present embodiment, the freelance expert system may be remote from on hold system 12, such as freelance expert server 22. In addition, in the present embodiment, freelance expert system may be local to on hold system 12, such as freelance expert call hold queue 42 that holds calls intended for freelance expert device 44. Freelance expert device 44 provides an interface for a freelance expert to communicate with a caller on hold within on hold system 12 via voice, text, video, graphics and other formats.

In particular, by providing the caller with the option to speak with a freelance expert, the caller may receive help in addition to that which would be provided by the representative. For example, companies that sell computer hardware typically only provide support for hardware and limited software issues. Callers with software questions beyond that provided by the company, but intertwined with a hardware issue, may receive help from a freelance expert specializing in the both the hardware and software. Such help would not be available from the company representative who is only trained to handle company specific hardware problems.

Another type of expert includes group experts who entertain questions within a particular query topic from multiple callers on hold. Each group expert is preferably skilled in at least one of the particular query topics and advantageously is able to manage multiple query topics, such that if no callers are interested in a particular query topic then the group expert assigned to that query topic can help manage questions for another query topic.

In the embodiment, one query related call group 46 is displayed, where callers transferred to the group can communicate with one another and with an expert communicating via group expert device 48. Query related call group 46 may include a conferencing calling system that allows multiple callers to participate in a broadcasted conversation.

In order to manage the conversation in query related call group 46, callers may indicate a readiness to ask a question by a keypad or voice entry. The readiness indicator is then placed in a queue that controls the order in which callers are connected to a group broadcast.

A further type of expert includes an emergency DJ expert, where callers have the option to select an emergency DJ expert discussing an emergency query topic that is the main concern of callers. In the embodiment, an emergency DJ group 50 is illustrated, where callers transferred to the group can log a question in a queue to be answered in order by a DJ expert who reads the question to the group and then answers the question. Emergency DJ group 50 may include a broadcasting system that enables a DJ expert to broadcast to multiple callers in the group via emergency expert device 52.

In particular, an emergency DJ expert option is particularly advantageous in lieu of playing a pre-recorded static message to all callers about an emergency, where those callers then continue to wait to speak to a representative or are left with an unsatisfactory opinion of an organization or company. For example, where a product defect has been discovered and the number of calls into a call center increases due to callers concerned about the product defect, callers may wait to speak individually to a representative, however while waiting may be included in a general session managed by an emergency DJ expert for dealing with the current subject receiving "emergency attention" by a call center. Rather than just receiving a prerecorded message about the product defect, callers can voice complaints, ask questions, and receive answers from the emergency DJ expert. While the emergency DJ expert may respond to callers with pre-written statements, callers will still feel like they have been heard in addition to receiving valuable information.

In addition, an emergency DJ expert option is particularly advantageous where an emergency is developing. For example, where a traffic accident has occurred and multiple witnesses call in to report the accident, an emergency DJ expert may be implemented for the accident such that the callers all speak to one expert in the accident. The witnesses can also work with the expert as a group to fill in the details of the physical emergency.

Further, an emergency DJ expert option is particularly advantageous where training multiple representatives to have expertise in a particular area is not timely or cost effective. Moreover, by allowing callers to receive answers to questions in a group setting, callers then will not wait to talk individually to a representative, thus freeing representatives to deal with less questions related to the emergency.

As a further advantage, controller 30 may monitor the query topics of current conversations with representatives to determine what topics constitute "emergencies" within the call center. Emergencies may be determined by the most common topic of questions. Controller 30 may then automatically establish an emergency DJ group for that most common topic. Alternatively, in response to a physical emergency or an action occurring for which a call center may expect an increase in callers, a new emergency DJ group may quickly be created to handle the increase in traffic.

Figure 3:
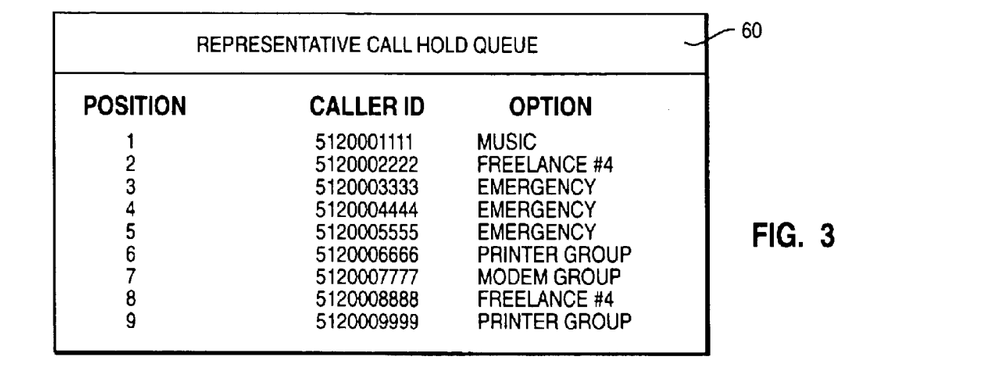
FIG. 3 depicts an illustrative embodiment of a representative call hold queue in accordance with the method, system, and program of the present invention.

With reference now to FIG. 3, there is an illustrative embodiment of a representative call hold queue in accordance with the method, system, and program of the present invention. As depicted, a representative call hold queue 60 includes records for calls currently on hold within an on hold system.

In particular, the position within the queue, the caller ID, and the service option selected by the caller are stored in representative call hold queue 60. In alternate embodiments, additional information including, but not limited to, the time of arrival, the time on hold, the time at a particular option, and other information about each call may be stored in representative call hold queue 60.

Advantageously, as calls are answered, each call still in the queue adjusts in position within the queue. In addition, callers may exercise options which allow additional control over a position within the queue as described in U.S. patent Ser. No. 10/004,664), herein incorporated by referenced. When a call reaches the top position (e.g. position "1"), the call is designated as next to be answered and a notification is sent to the service option currently holding the call that the call is next in line. If a caller declines to return, the call may be deleted from the queue or may be repositioned to allow the caller another opportunity to speak with a representative after a period of time.

Figure 4:
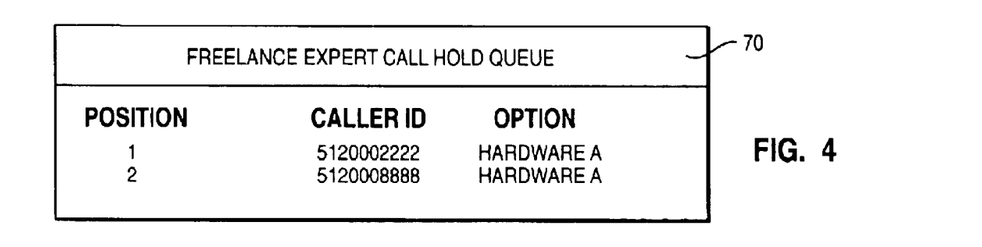
FIG. 4 illustrates an illustrative embodiment of a freelance expert call hold queue in accordance with the method, system, and program of the present invention.

Referring now to FIG. 4, there is an illustrative embodiment of a freelance expert call hold queue in accordance with the method, system, and program of the present invention. As depicted, a freelance expert call hold queue 70 includes a queue position, caller ID and query topic of each call. In addition, freelance expert call hold queue 70 may include billing information, time received, time answered, and other information that is useful to the freelance expert receiving the call. As calls are answered by a freelance expert, each call still in the queue adjusts in position.

Advantageously, each freelance expert may have an individual freelance expert call hold queue or multiple freelance experts may answer calls from a single freelance expert hold queue. Alternatively, a caller may only select the option of freelance experts that do not utilize a queue and are currently available.

Figure 5:
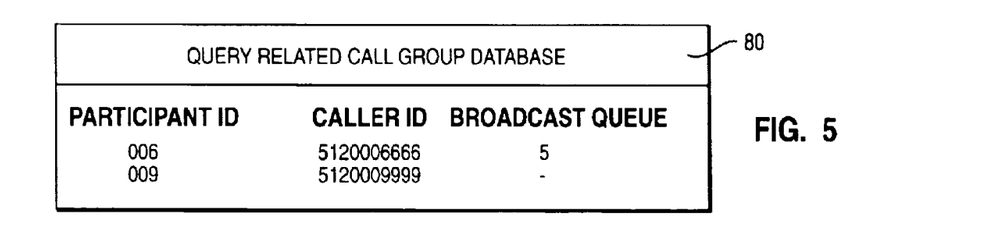
FIG. 5 depicts an illustrative embodiment of a query related call group database in accordance with the method, system, and program of the present invention.

With reference now to FIG. 5, there is an illustrative embodiment of a query related call group database in accordance with the method, system, and program of the present invention. As illustrated, query related call group database 80 includes participant IDs, caller IDs, and a position of a caller in a broadcast queue. In particular, each caller is assigned a participant ID that can be keyed in or voiced when the caller is ready to broadcast a question. In addition, when broadcast, the caller's participant ID is utilized to identify the caller to other participants.

The broadcast queue designates the order in which callers are granted access to the speaker function of the group that allows broadcasting a question to all callers participating in the group and then receiving a broadcast answer from the group expert. The broadcast queue may allow callers multiple positions within the queue or may only allow each caller one position within the queue at a time. In particular, once at the top of the queue, a caller may pose a question, the expert answers, and the caller may be provided additional broadcast time to converse directly with the expert and allow other callers to converse until the next caller is taken in the broadcast queue.

Figure 6:
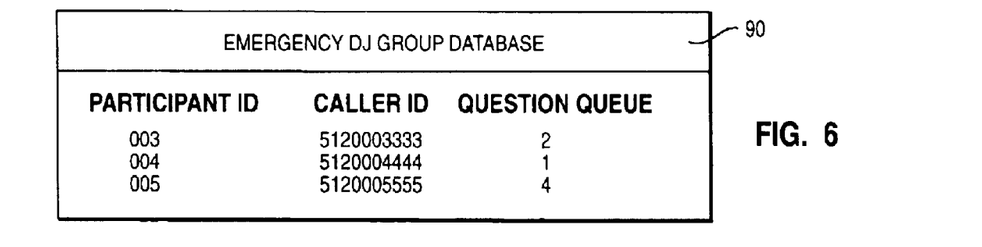
FIG. 6 illustrates an illustrative embodiment of an emergency DJ group database in accordance with the method, system, and program of the present invention.

Referring now to FIG. 6, there is an illustrative embodiment of an emergency DJ group database in accordance with the method, system, and program of the present invention. As illustrated, an emergency DJ group database 90 includes participant IDs, caller IDs, and a question queue.

The question queue indicates the order in which questions recorded by the callers are told to the group of callers and answered by an expert. In particular, each caller may request to log a question according to participant ID. The question queue holds the questions, such that the emergency DJ expert can answer the calls in an order. In addition, each question is preferably assigned an identifier such that when callers ask questions, they may refer to a previously asked question and answer.

Figure 7:
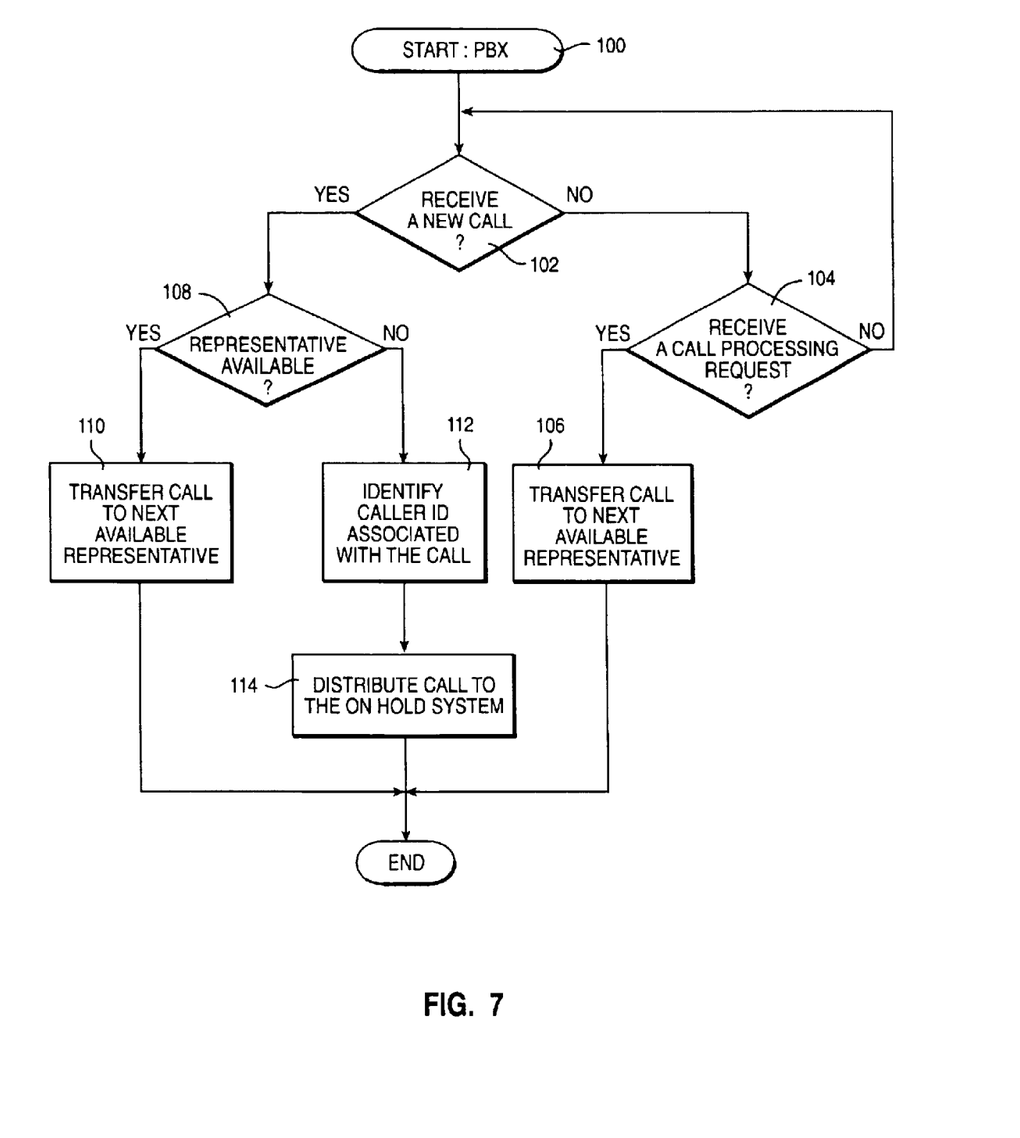
FIG. 7 depicts a high level logic flowchart of a process and program for controlling a PBX in accordance with the method, system, and program of the present invention.

With reference now to FIG. 7, there is depicted a high level logic flowchart of a process and program for controlling a PBX in accordance with the method, system, and program of the present invention. As illustrated, the process starts at block 100 and thereafter proceeds to block 102.

Block 102 depicts a determination as to whether a new call is received. If a new call is received, then the process passes to block 108. If a new call is not received, then the process passes to block 104. Block 104 illustrates a determination as to whether or not a call processing request is received. When a call is at the top of the call queue, the call is preferably transferred back to the PBX with a call processing request. If a call processing request is not received, then the process passes to block 102. If a call process request is received, then the call is transferred to the next available representative, as depicted at block 104, and the process ends.

Block 108 illustrates a determination as to whether or not a representative is available. If a representative is available, then the call is transferred to the next available representative, as illustrated at block 110, and the process ends. If a representative is not available, then the process passes to block 112. Block 112 depicts identifying the caller ID associated with the call. Next, block 114 illustrates distributing the call to the on hold system, and the process ends.

Figure 8:
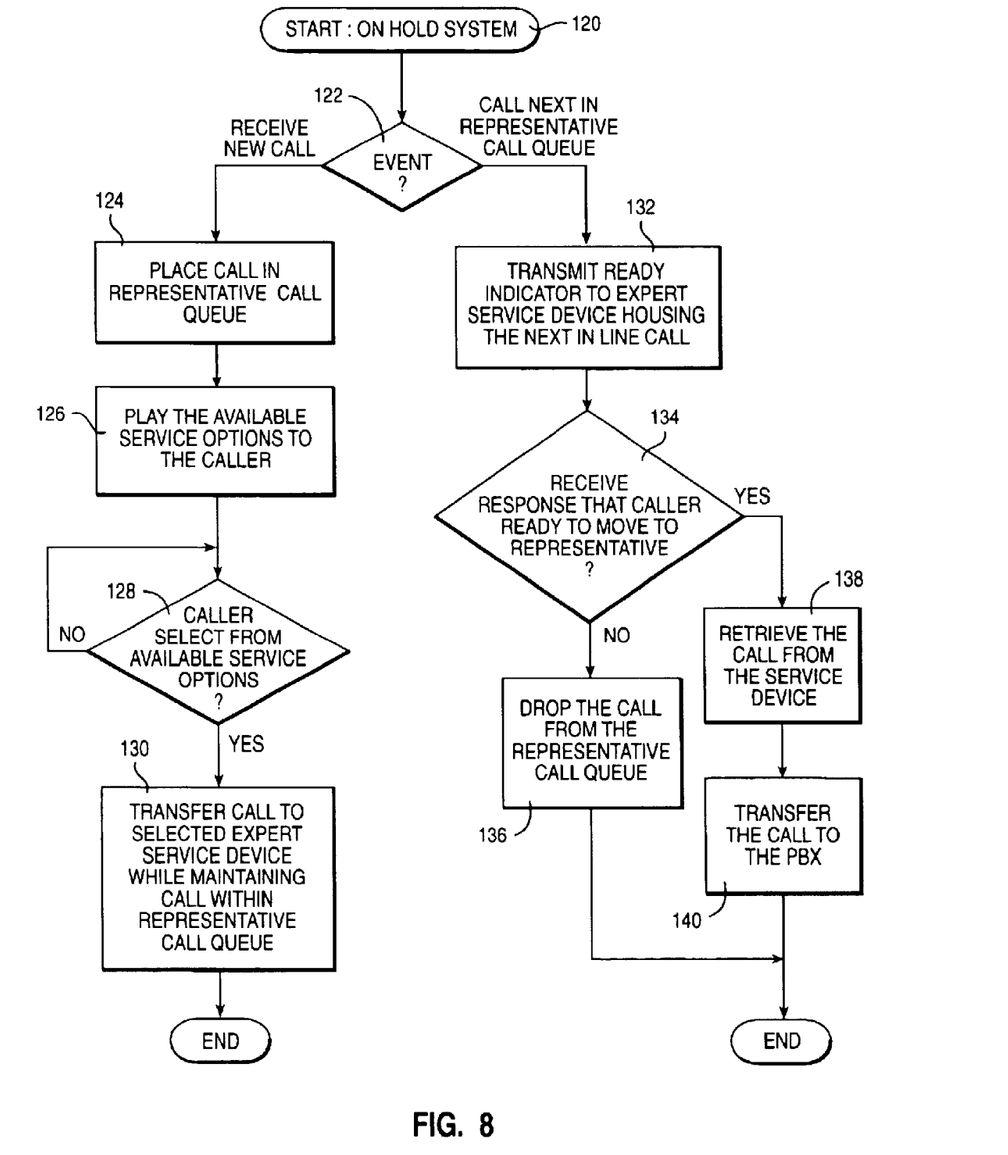
FIG. 8 illustrates a high level logic flowchart of a process and program for controlling an on hold system in accordance with the method, system, and program of the present invention.

Referring now to FIG. 8, there is illustrated a high level logic flowchart of a process and program for controlling an on hold system in accordance with the method, system, and program of the present invention. As depicted, the process starts at block 120 and thereafter proceeds to block 122.

Block 122 illustrates a determination as to the type of event that occurred when an event occurs. If a new call is received, then the process passes to block 124. If a call is the next in line to be transferred to a representative, then the process passes to block 132.

Block 124 depicts placing the call in the representative call queue. Next, block 126 illustrates playing the available service options to the caller. Thereafter, block 128 depicts a determination as to whether a caller has selected from the available service options. The process iterates at block 128 until an option is selected and then passes to block 130. Block 130 illustrates transferring the call to the selected expert service device while maintaining the call record within the representative call hold queue. Then, then process ends.

Block 132 illustrates transmitting a ready indicator to the expert service device housing the next in line call. Next, block 134 depicts a determination as to whether a response is received that the caller is ready to move to the representative. If a ready response is not received, then the call is dropped from the representative call queue, as depicted at block 136, and the process ends. If a ready response is received, then the process passes to block 138.

Block 138 depicts retrieving the call from the expert service device. Next, block 140 illustrates transferring the call to the PBX and advancing the call, and the process ends.

Figure 9:
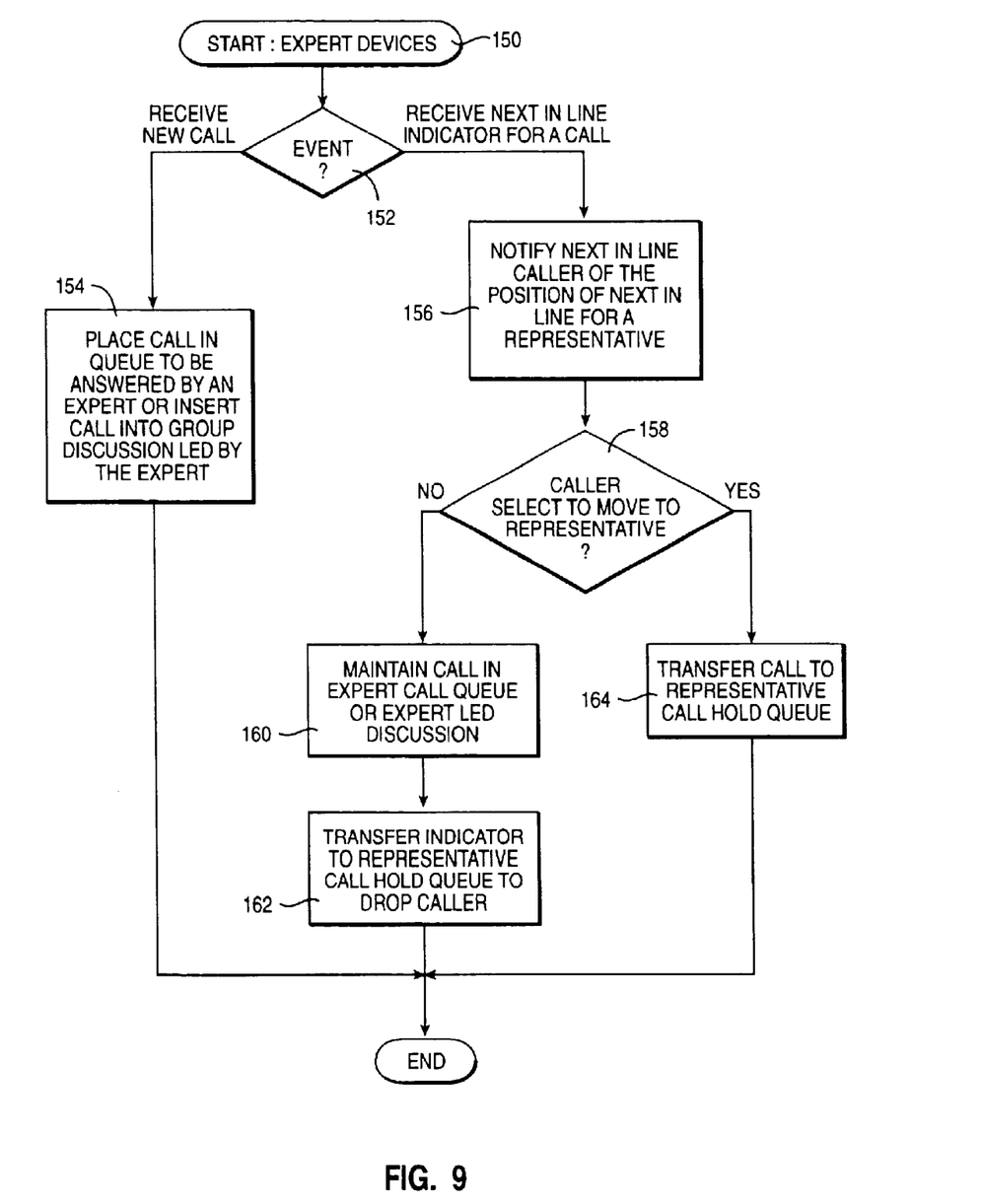
FIG. 9 depicts a high level logic flowchart of a process and program for controlling an expert system in accordance with the method, system, and program of the present invention.

With reference now to FIG. 9, there is depicted a high level logic flowchart of a process and program for controlling an expert system in accordance with the method, system, and program of the present invention. As illustrated, the process starts at block 150 and thereafter proceeds to block 152.

Block 152 depicts a determination as to the type of event that occurred when an event occurs. If a new call is received, then the call is placed in a queue to be answered by an expert or the call is inserted in a call group led by an expert, depending on the type of expert service selected, at block 154. If a next in line indicator is received for a call, the process passes to block 156.

Block 156 illustrates notifying the next in line caller of the next in line position for a representative. Next, block 158 depicts a determination as to whether the caller selects a readiness of move to the representative. If the caller selects a readiness, then the call is transferred to the representative call hold queue, as depicted at block 162, and the process ends. If the caller does not select a readiness, then the process passes to block 160. Block 160 depicts maintaining the call in the expert call queue or expert led group. Next, block 162 illustrates transmitting an indicator to the representative call hold queue to drop the caller, and the process ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for on hold queue management comprising:

receiving a call from a caller at a call center;

placing said call on hold in a first hold queue until a representative of said call center is available to answer said call;

responsive to information needs of said caller, placing said call on hold in a second hold queue within said first hold queue, wherein calls placed in said second hold queue are answered in order by an expert; and responsive to said call in position to be answered within said first hold queue, allowing said caller to remain in said second hold queue or transfer to said representative.

2. The method for on hold queue management according to claim 1, wherein calls placed in said second hold queue are answered by a next available freelance expert from among a plurality of freelance experts.

3. A system for on hold queue management comprising:

a call center for receiving a call from a caller;

means for placing said call on hold in a first hold queue until a representative of said call center is available to answer said call;

means responsive to information needs of said caller, for placing said call on hold in a second hold queue within said first hold queue, wherein calls placed in said second hold queue are answered in order by an expert; and means responsive to said call in position to be answered within said first hold queue, for allowing said caller to remain in said second hold queue or transfer to said representative.

4. The system for on hold queue management according to claim 3, wherein calls placed in said second hold queue are answered by a next available freelance expert from among a plurality of freelance experts.

5. A computer program product for on hold queue management, said computer program product comprising:

a recording medium;

means, recorded on said recording medium, for enabling receipt of a call from a caller at a call center;

means, recorded on said recording medium, for placing said call on hold in a first hold queue until a representative of said call center is available to answer said call;

means, recorded on said recording medium, for placing said call on hold in a second hold queue within said first hold queue, wherein calls placed in said second hold queue are answered in order by an expert; and means, recorded on said recording medium, for allowing said caller to remain in said second hold queue or transfer to said representative when said call is in a top position in said first hold queue.

* * * * *